3,439,030
C-9 TO C-20 p-ALKYLPHENYL-
DICHLOROBORANES
Melville E. D. Hillman, Corte Madera, Calif., assignor to Chevron Research Corporation, a corporation of Delaware
No Drawing. Filed Apr. 23, 1964, Ser. No. 362,186
Int. Cl. C07f 5/02
U.S. Cl. 260—543     2 Claims

ABSTRACT OF THE DISCLOSURE

This invention relates to the novel $C_9$–$C_{20}$-alkyl-p-phenyldichloroborane compounds and their use for the production by hydrolysis of a new class of detergent compounds, particularly low foaming detergents for use in tumbler type washing machines. On the other hand, when a rich foam is desired, the addition of a minor amount of mannitol to the foregoing detergents yields an excellent foam.

---

This invention relates to dichloroborane compounds. More particularly, it relates to alkylphenyldichloroboranes.

The compounds of this invention are particularly desirable as reactive chemical intermediates for the manufacture of oleophylic detergents for gasoline motor fuels, low foaming wash-machine detergents and insecticidal compounds.

In accordance with the present invention, novel compounds of the general formula $$p\text{-}RC_6H_4BCl_2$$

are prepared by the reaction of $C_9$–$C_{20}$-alkylbenzenes with boron trichloride in the presence of a Friedel-Crafts type catalyst. These compounds upon hydrolysis yield alkylphenylboronic acids which are soluble in gasoline and lubricating oils and useful as detergent additives therein. The alkaline salts of the alkylphenylboronic acids are useful detergents for use in water. Similarly, in the reaction of these dihaloboranes with ammonia or amines, ammoniated alkylphenylboranes are produced which likewise are useful additives.

The alkylphenyldichloroboranes of this invention may be prepared by the reaction of boron trichloride in the presence of aluminum metal or aluminum chloride activated by methyl iodide. The reaction is exothermic and proceeds readily at temperatures in the range from about 0–50° C.

EXAMPLE 1

A monoalkylbenzene prepared from a $C_9$–$C_{15}$ polypropylene alkylated benzene having the following physical characteristics:

B.P. range (760 mm. Hg), ° C. _____ 260–312
Specific gravity _____ 0.871
Refractive index, $n_D^{20}$ _____ 1.4875
Average mol. wt. _____ 245 by introducing boron trichloride gas into a mixture of the above alkylbenzene (213.3 g.), methyl iodide (0.5 g.) and aluminum chloride (0.5 g.) contained in a 0.5 liter round bottomed flask fitted with a stirrer, a Dry Ice reflux condenser and a drying tube to exclude atmospheric moisture. Reaction occurred essentially immediately as evidenced by a temperature increase of the reactants from 25 to 39° C. After the addition of the boron trichloride was complete, the stirring was continued for a total reaction time of 1.5 hours.

After removal by distillation of unconsumed boron trichloride and alkylbenzene, the product, $$p\text{-}C_{10-15}H_{21-31}C_6H_4BCl_2$$

was distilled at 1.0 mm. Hg pressure in the boiling point range 170–205° C. This product (30.3 g.) was a yellow liquid which fumed upon contact with moist air and reacted vigorously with water yielding two moles of hydrogen chloride per mole of the compound.

EXAMPLE 2

Hydrolysis of alkylphenyldichloroborane

A portion of the above obtained product was mixed with water resulting in the evolution of hydrogen chloride and the production of alkylphenylboronic acid. The acid was neutralized with sodium hydroxide to a solution pH in the range 9–10. This soltuion had detergent qualities and produced a low foam of the type desirable for tumbler washing machine use.

EXAMPLE 3

To a portion of the solution prepared in Example 2 was added a minor amount of mannitol, and the foaming qualities of the mixture were tested. An excellent foam was produced.

The present invention contemplates alkylphenyldichloroboranes produced from highly branched alkylbenzenes as well as from straight-chain alkylbenzenes, and particularly those produced from n-$C_9$–$C_{20}$ alkylbenzenes obtained from n-$C_9$–$C_{20}$ cracked wax olefins and benzene including individual molecular weights cuts and mixtures.

Representative individual compounds are $$\text{n-}C_9H_{19}C_6H_4BCl_2$$

$$\text{n-}C_{10}H_{21}C_6H_4BCl_2,\ \text{n-}C_{16}H_{33}C_6H_4BCl_2,$$

$$CH_3(p\text{-}C_6H_4BCl_2)CH(CH_2)_2C(CH_3)_2CH_2CH_3$$

and the like dichloroboranes as represented by the general formula $$p\text{—}R\text{—}C_6H_4BCl_2$$

wherein R is an alkyl group having from 9 to 20 carbon atoms per group.

I claim:
1. The composition as represented by the general formula

$$p\text{-}RC_6H_4BCl_2$$

wherein R is an alkyl group having from 9 to 20 carbon atoms per group.

2. The composition of claim 1 wherein R is a polypropyl group.

References Cited

UNITED STATES PATENTS 3,072,715    1/1963    Wilcockson _____ 260—543

FOREIGN PATENTS 854,924    11/1960    Great Britain.

JAMES A. PATTEN, *Primary Examiner.*

H. C. WEGNER, *Assistant Examiner.*

U.S. Cl. X.R.

44—76; 252—49.6, 156; 260—500.5